Figure 1:
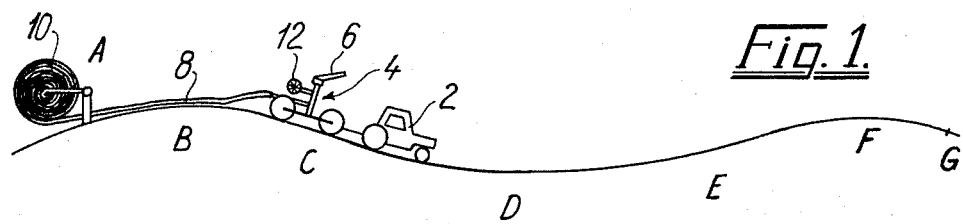

United States Patent [19]

Nörtoft

[11] 4,226,366
[45] Oct. 7, 1980

[54] IRRIGATION SYSTEMS

[76] Inventor: Gunnar P. Nörtoft, Sejrup, 7323 Give, Denmark

[21] Appl. No.: 909,521

[22] Filed: May 25, 1978

[30] Foreign Application Priority Data

May 27, 1977 [GB] United Kingdom ............... 22589/77

[51] Int. Cl.² .............................................. B05B 3/18
[52] U.S. Cl. ...................................... 239/69; 239/70; 239/191; 239/709
[58] Field of Search ................................... 239/63-65, 239/67-70, 99, 188-191, 195, 198, 199; 137/344, 355.12, 551

[56] References Cited

U.S. PATENT DOCUMENTS

| | | | |
|---|---|---|---|
| 2,918,800 | 12/1959 | Ford | 239/70 X |
| 3,150,830 | 9/1964 | Griffith | 239/70 X |
| 3,583,636 | 6/1971 | Lacey | 239/189 |
| 3,836,078 | 9/1974 | Olson et al. | 239/70 |

*Primary Examiner*—Johnny D. Cherry
*Attorney, Agent, or Firm*—Craig & Antonelli

[57] ABSTRACT

A field irrigator of the movable type, adapted to move slowly through a long irrigation zone and comprising a rotary water gun mounted on a drive chassis and receiving water through a hose from a supply source at one end of the irrigation zone. The irrigator is connected or provided with a control system causing the chassis to move stepwise along the zone and wait at the end of each short step until an irrigation detector, preferably a timer, has registered the attainment of a predetermined irrigation in or along the step. A truly constant irrigation along the entire zone is obtained when the steps are of uniform lengths and the irrigation is set to be the same by each step, while a differentiated irrigation along the zone is obtainable when the control system includes a memory unit for storing selective irrigation requirements for the various steps or groups of steps.

16 Claims, 4 Drawing Figures

IRRIGATION SYSTEMS

This invention relates to an agricultural irrigation apparatus of the type having a water supply hose, one end of which is connectable with a stationary water supply source while the other end thereof is connected with an irrigation device such as a rotatable water gun, which is mounted on a ground supported carrier structure connected with means for its being advanced along an irrigation zone across a field area. Irrigations systems of this type are now widely used instead of prior systems requiring laying out of long pipe lengths and a plurality of water guns along such a length. In systems of the type in question it is sufficient to use a single irrigation device and a sufficient length of a flexible hose, as it is then—in any of many different manners—possible to propel the irrigation device at suitably low velocity along the irrigation zone, and the same device is usable for irrigating a number of parallel zones, whereby there is no need to move a whole system of rigid pipes. It is normal practice to bring the irrigation device to the farthest end of the watering zone e.g. by means of a tractor, and to concurrently lay out the hose, whereafter water is supplied to the hose and the irrigation device is caused to move slowly through the zone by means of either a winch or driven ground engaging wheels of the device. With the use of a winch, mounted either at the home end of the hose or on the irrigation device driven e.g. by a water turbine, the device may be moved by means of a special pulling wire or by reeling up the hose itself, while with the use of driven support wheels the hose may also be reeled up or it may be left in a loop on the field behind the irrigation device.

The use of a traction winch for the hose involves a steadily increasing pulling speed as the hose diameter increases on the reel, and it is already known to arrange for automatic adjustment of the angular speed of the reel in accordance with the hose diameter thereon in such a manner that the irrigation device is moved at practically constant speed throughout the irrigation zone, this being necessary for obtaining uniform irrigation along the zone. It would be possible to maintain constant irrigation by varying speed, if the water supply rate was varied correspondingly, but at least for irrigation by a rotating water gun this would be disadvantageous, since also the effective width of the irrigation zone would be changed.

Thus, it is generally desirable to make use of a constant water supply and a constant, low advancing velocity of the irrigation device, normally between 5 and 50 m/h. Irrespective of the manner of propelling the irrigation device it is of course possible to arrange for such a low moving speed, but with some of the driving methods used it is nevertheless difficult to obtain this in a reliable manner.

It is the purpose of this invention to provide an irrigating apparatus which is easily controllable in a reliable manner for attaining a predetermined irrigation rate along the irrigation zone.

In the apparatus according to the invention the means for advancing the irrigation device are operatively connected with control means for automatically causing the irrigation device to be advanced stepwise along relatively short partial lengths of the irrigation zone in such a manner that the advancing of the irrigation device along each new partial length will be postponed until it has been positively detected by irrigation detecting means that the total irrigation in or along the previous partial movement step has complied with predetermined irrigation requirements. The invention is based on the cognition that in order to produce a sufficiently uniform irrigation it is not necessary to drive the irrigation device with constant speed, as it would even be possible to make the irrigation device completely inoperative during its motion, if on the other hand it is operative to the required degree while it is kept at rest in each of a row of zone points located with reasonably small mutual distance. Thus, if a sufficient irrigation is effected during stillstand of the irrigation device in the different points interspaced for example $\frac{1}{2}$–4 m it will be without significance for the total irrigation that the irrigation has not been carried out during constant motion of the irrigation device. Such an arrangement involves that the propelling means should not be specifically adapted to drive the irrigation device extremely slowly, nor with finely adjustable speed, since by intermittent operation they may be adapted to move the irrigation device with a speed which may be relatively high and even non-adjustable just as it need not be the same throughout the entire irrigation zone. In practice there will be no reason or need to stop the irrigation while the irrigation device is being moved through each of the said short partial lengths when it is only ensured that the irrigation taking place during the motion will form part of the total irrigation per length, and it will be appreciated, therefore, that the invention is merely based on the principle of controlling the average speed of the irrigation device along the irrigation zone for obtaining a predetermined irrigation by the said intermittent movement operation.

The said irrigation detecting means may be constituted by various devices according to the desired degree of accuracy of the detection. Theoretically a rather accurate detector would be a pluviometer device capable of producing a control signal by each filling up to a predetermined level, but alternatively a flowmeter may be used in the water conduit to the water gun, whereby the detection may be carried out either at the water supply end of the hose or at the irrigation device itself. When the water supply is reasonably constant the detection of the desired irrigation per partial zone length may alternatively be made on a time basis, such that between start or stop for two consecutive partial lengths a predetermined time interval shall lapse, and of which a part may lapse while the irrigation device is moving along the particular partial length.

It will be appreciated that the said detecting means, especially when constituted by a timing device, may easily be adjustable to cause any desired rate of irrigation.

The more detailed circumstances about the invention may be regarded in connection with two main aspects thereof, referring to constant irrigation and differentiated irrigation respectively, and these aspects will now be described separately:

(1) "Constant Irrigation".

As already mentioned the invention is advantageous in that the propelling means may drive the irrigation device with a rather high and non-critical speed, and the invention, therefore, is generally advantageous for obtaining a uniform irrigation along the entire irrigation zone, as normally desired. However, the invention is of specific importance in connection with a preferred type of propelling means, namely where the irrigation device is driven by a hydraulic motor powered by a branch flow of the water as supplied to the water gun, the motor serving to rotate a ground engaging driving wheel of the irrigation device. Though this is a preferred driving arrangement it nevertheless shows the difficulty that a constant propelling speed is depending of a well defined engagement between the driving wheel and the ground all the way along the irrigation zone; it frequently happens, however, that the driving resistance is locally increased, e.g. in muddy areas, and driving wheels operating at constant speed will thus in no way ensure that the propelling speed of the irrigation device will be constant, such as required according to the prior art. According to a preferred feature of the present invention the said partial lengths of the irrigation zone are defined purely geometrically, e.g. by means of a ground follower wheel on the irrigation device, this wheel rolling passively when the irrigation device is moving and serving to measure out a predetermined partial length, e.g. by means of a detector responding to the wheel being rotated one or more full revolutions. The single partial length will hereby be measured out with good accuracy even if the driving wheels during the passage along this length have not been able to drive the irrigating device with a speed corresponding to the driving speed of the wheels, and when the irrigating device is stopped at the end of the partial length, by a stop signal produced by said revolution detector, the irrigation may continue until the irrigation detector, e.g. the said timer, has detected or effected the predetermined amount of irrigation per partial length, whereafter the irrigation device may proceed driving through the next partial length. Thus it will be quite unimportant whether the movement through a partial length takes place rapidly or slowly, though of course it should be ensured that the irrigation device will normally reach the end of a partial length before the said predetermined irrigation has been attained. By way of example the partial length as defined by the ground follower wheel may correspond to an optimal driving time of two minutes, while the required irrigation time per length may amount to ten minutes, whereby it will cause no harm should the irrigation device exceptionally need 8-9 minutes to work itself through the partial length. It could happen that the irrigation device meets a blocking resistance, but as described below it is then easily possible to obtain automatic stoppage of the irrigation and even a transmission of an emergency signal to the home end of the hose.

The division of the irrigation zone into geometrically defined partial lengths may be effected otherwise, e.g. by means of special abutment members mounted on the laid out hose, when the irrigation device is moved home along the hose and is provided with sensor means for detecting the passage of said abutment members. If—as considered in this connection—a uniform irrigation is desired along the entire irrigation zone the abutment members should of course be mounted with constant mutual spacing along the hose. Principally an adjustment of the irrigation can be effected by mounting the abutment members with an other mutual spacing or by making the ground follower wheel measure out partial length of a correspondingly changed distance, but in practice it seems preferable to effect the adjustment by adjusting the detector means for detecting or effecting the attainment of the desired irrigation rate per partial length.

(2) "Differentiated Irrigation".

The above example of arranging on the hose a row of uniformly spaced abutment members may be theoretical more than practical, but it is illustrative of a manner of defining the single partial length so as to obtain constant irrigation along the irrigation zone. It will be appreciated, however, that it would also be possible to arrange the abutment or actuation members with non-uniform spacing, whereby a correspondingly non-uniform irrigation will be obtainable along the irrigation zone, should this be desired, and in fact this is a very important aspect of the present invention. The prior art has been concerned with a completely even irrigation, but frequently the real situation will be that the irrigation requirements throughout the irrigation zone will not at all be the same, e.g. because for optimal irrigation hill portions should receive more water per square unit as compared with valley portions, and furthermore the irrigation zone may comprise ground areas or crop areas of specific irrigation requirements. In use, the known irrigation devices are adjusted to effect an irrigation according to a suitable compromise or average, but often this will involve under- and over-irrigation of respective individual portions of the zone.

When, according to the present invention, the irrigation is controlled on the basis of the irrigation zone being divided in a row of partial lengths it will be easy, as illustrated by the above example, to differentiate the irrigation along the zone in accordance with local requirements, irrespective of how the partial lengths are defined and of what type of propelling means are used. Whether the partial lengths or steps are defined geometrically or by moving time intervals of the irrigation device, the single lengths or steps will follow each other in a well defined manner so as to be located at predetermined positions along the irrigation zone, and it is possible, in any of a plurality of various manners, to effect such a control of the irrigation device that the resulting irrigation per step is automatically adjusted according to the preset irrigation requirements in or along the individual partial lengths. Thus, when actuator members are placed on the hose according to the above example these members may be placed with reduced mutual distance across a hill portion, whereby, when the control system is still operating to provide a constant irrigation per partial length, this constancy will result in an increased irrigation per square unit when the partial lengths or steps are thus made relatively short. However, another and preferred possibility is to provide the irrigation device with a central control register cooperating with a presettable memory device indicative of the desired individual irrigation per consecutive step, whereby either the individual step lengths or the individual irrigation time intervals during which the irrigation device is present in the various steps, will be variable according to the irrigation requirements. In this type of operation there will typically be maintained a constant irrigation throughout a number of consecutive steps, whereafter in a following number of steps the irrigation is again kept constant, but at a changed rate.

For controlling the operation use may of course be made of any type of presettable or precodable memory means. Precoding of a differentiated irrigation along the entire irrigation zone may require a previous measuring out of the zone, and this can be a considerable work, though it may well be justified especially if each parallel zone may be accorded some standard coding for repeated use year after year. In such a system it will even be possible to make use of interchangeable control devices such as tape cassettes or punched cards each referring to one or more specific irrigation zones. However, the invention also includes the special possibility of enabling a presetting of the memory control unit during the outbound movement of the irrigation device, in direct connection with the passage of such places along the zone, where it is desirable to effect a change of the irrigation by the later operative return movement of the irrigation device. Hereby it is not necessary to measure out the various zone portions, as it is sufficient to make use of a drive register for automatically recording the outbound movement and receiving the consecutive irrigation orders as set by the operator, whereafter the irrigation orders are effected in a reversed and thus correct sequence when the device later on carries out its operative return movement.

Figure 2:
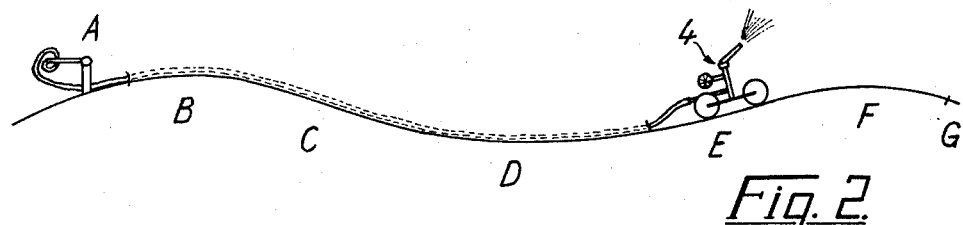
Figure 3:
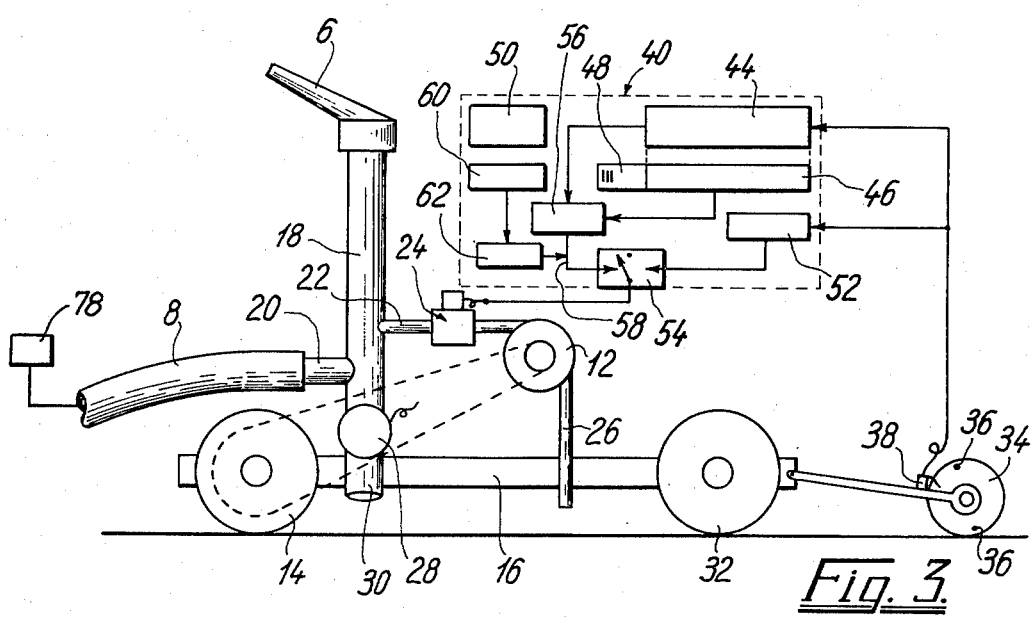
Figure 3A:
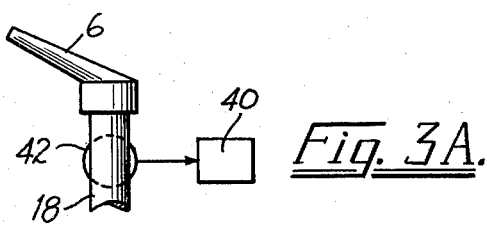

In the following the invention is described in more detail, by way of example, with reference to the accompanying drawings, in which:

FIG. 1 illustrates the bringing out of the irrigation device towards the remote end of the irrigation zone, FIG. 2 illustrates the return irrigation movement of the device, and FIG. 3 is a schematic side view of the irrigation device and a block diagram of the control system thereof, FIG. 3A showing a modified aspect thereof.

In FIG. 1 is shown a tractor 2 driving an irrigation device, designated 4, outwardly along an irrigation zone. The device 4 has a rotary water gun 6 which is connected via a hose 8 to a water supply source A at the home end of the zone. As indicated, the hose is mounted on a reel 10 adjacent the point A, but the reel might as well be placed on the device 4. By its outbound movement the device 4 passes a hill B, a hill side C, a valley D, another hill side E and a new hill top F, and finally a stop point G near the top F. The tractor 2 drives home when the device 4 has been brought to the point G, and then the water supply is initiated to start the irrigation by way of the rotating water gun 6. The irrigation device is provided with driving wheels driven by a hydraulic motor 12 by means of the water supplied through the hose 8 such that the device 4 will thereafter move slowly back towards the starting point A, guided in any suitable manner such as by steering means following the hose on the ground; the hose may be wound onto a reel or may be left in a loop behind the irrigation device.

If—as in the prior art—the irrigation device is now caused to move slowly home the device will of course tend to irrigate the entire irrigation zone in a uniform manner, but two important circumstances should be noted, viz. (1) that the irrigation is aimed to be constant despite the fact that the hill portions B and F may hereby be subjected to underirrigation relative to the valley D in which the irrigation requirements will normally be smaller, and (2) that the irrigation device may move in a non-constant manner if the driving resistance varies along the irrigation zone, whereby certain portions of the zone may be subjected to over-irrigation if the irrigation device meets increased resistance and thus slows down its velocity.

The irrigation device shown in FIG. 3 is provided with control means operable to counteract both of the above mentioned drawbacks of the known systems.

In FIG. 3 it is shown in more detail that the irrigation device 4 is provided with driving wheels 14 mounted on a frame 16 which also carries the hydraulic motor 12 and a vertical supply tube 18 for the water gun 6. This tube has a connector stub 20 for the hose 8 and a branch tube 22 for supplying water to the motor 12 through a solenoid valve 24, the water leaving the motor through an outlet pipe 26. The lower end of the tube 18 includes a safety valve 28 mounted above a lower free outlet 30, this valve normally being closed. The motor 12 is drivingly connected with all or some of the wheels 14 so as to drive the device 4 when the valve 24 is open.

The irrigation device has an idler wheel, either a support wheel 32 or—as shown—an extra wheel 34 running passively on the ground and having actuator members 36 cooperating with a revolution responsive contactor 38 connected to a control unit 40.

Via the contactor 38 the wheel 34 will detect the true distance as moved by the irrigation device from the return point G, and the control unit 40 is designed so as to start and stop the motor 12 by operating the valve 24 at such intervals that the irrigation device is moved stepwise through short partial lengths (steps) of the irrigation zone and is stopped for each step during a time interval sufficient to ensure that a predetermined irrigation has taken place in or along the particular step. Thereafter the valve 24 is automatically reopened, and the device moves along the next step, e.g. corresponding to two or three revolutions of the wheel 34; now the device is stopped and not allowed to restart until it has been detected that the predetermined irrigation is achieved also in this step.

The irrigation detection may be carried out in different manners, ideally by means of a contact pluviometer carried by the irrigation device. Another possibility is to use a contact water meter 42 inserted in the supply tube 18 so as to produce a control signal each time it has been passed by the predetermined amount of water per step. Alternatively—and preferred in practice—the irrigation control may be effected by means of a timing device having a timer which is reset by the start of each step and is preset to restart the irrigation device, upon the device having reached the end of the step, when a time interval corresponding to the desired irrigation per step has lapsed. Normally the water supply is rather constant, so it will be satisfactory to control the irrigation on a time basis.

When the control means are thus operable to secure a particular, predetermined irrigation per well defined step of movement of the irrigation device it will thus be ensured that the irrigation is constant throughout the length of the irrigation zone. Should the irrigation device meet an increased driving resistance, e.g. in slippery ground, it may well move at reduced speed, but still the wheel 34 will measure out the correct step length, and this length may be chosen short enough relative to the desired amount or time of irrigation per step to ensure that normally the device will always reach the end of a step before the desired irrigation is completed.

Should the device get completely stuck the control unit 40 will detect that the valve 24 is still open at the moment of time where it is sought to be reopened by the irrigation detector means, and in this situation the control unit may be operable to cause opening of the security valve 28, whereby practically the entire water flow from the hose 8 is exhausted through the wide outlet opening 30. Hereby a pressure drop will occur in the hose 8, and at the home end thereof gauge means may be provided for detecting such a pressure drop and for causing the water supply to be closed in response thereto. Such a water control gauge arrangement is schematically shown connected to hose 8 at 78. Of course, should the said unlucky situation arise there will be many other possibilities for transmitting a suitable emergency signal to the home end of the system.

The irrigation will be adjustable according to the requirements either by making the step length adjustable, e.g. by means of a presettable counter for counting the required number of full or partial revolutions of the wheel 34 for each step, or by making the total irrigation per step adjustable, e.g. by means of an adjustable timer. Hereby the irrigation along the entire irrigation zone may be kept constant at the desired rate.

However, with modern control technology it is relatively easy to modify the control unit 40 in such a manner that the irrigation rate will be presettable for each single or consecutive step along the irrigation zone, whereby it will be possible to effect the irrigation in a selective manner therealong, according to predetermined requirements. Thus the control unit may be preset to effect a relatively heavy irrigation per step along the distance G-E and thereafter a less heavy irrigation along the distance E-C, whereafter the irrigation rate may again be increased along the hill portion B. It will be readily understood that the irrigation rate may be controlled by preprogramming the control unit either to effect a constant irrigation in or along consecutive steps of adjustable and preset lengths or to effect a selective amount of irrigation per constant standard length of said steps. This type of control will be achievable in any of a vast amount of various manners, and the following example, therefore, is only illustrative of one of the practical possibilities. On the other hand, this example will also be illustrative of a principal possibility of effecting the adjustment or presetting of the control unit in accordance with irrigation requirements as observed in the field during the outbound movement of irrigation device, without any need of measuring out beforehand the location of the partial irrigation zone portions requiring an irrigation deviating from any standard or average irrigation along the zone. To this end the irrigation device and its control unit 40 are designed so as to allow for the desired irrigation rate of any partial length of the irrigation zone to be set as the device passes this partial length during its inoperative outbound movement, whereafter the device will automatically reproduce the required irrigation conditions as it carries out its operative homebound movement.

In the example shown in FIG. 3 the control unit 40 comprises a drive register 44 connected with the contactor 38 of the wheel 34 so as to be shifted consecutively during the outbound movement of the device in accordance with the revolutions of the wheel 34. In connection with the drive register is provided a memory unit 46 and a keyboard 48, the latter having keys enabling various desired irrigation rates to be set or read into the unit. During the outbound movement from point A the drive register will be shifted according to the distance of travel, and when the point C is reached the keyboard is operated to read into the memory unit 46 the rate of irrigation desired along the partial zone length C-A by the later operative return movement of the irrigation device. When thereafter the point E is reached or passed the keyboard is operated for setting of the desired irrigation rate along the length E-C, and again this information is stored in connection with the particular stage of the drive register 44. Finally, in the last point G the desired irrigation rate along the length G-E is read in by actuation of the keyboard.

The power supply of the control unit 40 is effected by a battery 50.

When the irrigation device in the point G is actuated for homebound movement by opening of the water supply to the hose 8 the roller wheel 34 causes a counting down of the drive register 44, and for each short partial length or step a step detector 52 will produce a closing control signal to a control contactor 54 for the solenoid valve 24 so as to hereby cause the irrigation device to stop.

Concurrently with the initiation of the return movement of the irrigator device from the point G is started a timer 56 which is connected with the memory unit 46 in such a manner that it produces a control signal on an output wire 58 when since the start of the timer a time interval has lapsed corresponding to the stored irrigation information relating to each of said steps along the partial length G-E. This control signal is fed to the contactor 54 for effecting a reopening of the valve 24, whereafter the irrigation device moves further along the next partial length or step as soon as the predetermined irrigation has been achieved in or along the preceding step.

By the start of the irrigation device along the next step, which is as a whole located in front of the point E, the memory unit 46 will adjust the timer 56 to the same irrigation time as before, in the preceding step, such that the irrigation device will stop when the step detector 52 causes the valve 24 to close upon the wheel 34 having measured out the new step of movement, whereafter the irrigating device is restarted when the timer 56 causes the valve 24 to reopen at the end of the preset irrigation time. Hereafter the irrigation device will work itself further step by step, and when the point E is reached the memory unit 46 will thereafter cause the timer 56 to change the irrigation time per following step as corresponding to the presetting of the memory unit for the partial length E-C, whereafter the irrigation time per step will again be changed when the irrigation device passes the point C.

In practice it is preferred to design the control unit 40 in such a manner that in each of the change points (G, E, C) the memory unit is set, during the outbound movement, with reference to the requirements of the following (not the preceding) partial length, the control unit thereafter, during the homebound operative movement, operating to control the irrigation from each change point, e.g. E, based on the setting of the memory unit in the point, e.g. C, which during the outbound movement was the preceding change point. This feature, of course, is independent of the detailed mode of operation of the irrigation device along the various lengths between the change points.

The control unit 40 is provided with a start button 60 which causes actuation of the irrigation device for normal operation, but additionally actuates a delay circuit 62 serving to hold the contactor 54 open and therewith the motor valve 24 closed during a time interval longer than corresponding to the irrigation time for the first step as defined by the setting of the memory unit. In this manner it is counteracted that the first step or steps from the point G will be under-irrigated as a consequence of their being withdrawn the irrigation which is normally applied to any step from the watergun prior to its coming up to the particular step; thus, according to a typical example, the steps may be of a length of some 2-3 meters while the irrigation diameter of the water gun may be some 40-80 meters. Correspondingly the control unit may be adapted to make the irrigation device continue the irrigation during a relative long interval of time upon its being stopped at the home end of the irrigation zone for obtaining a suitable compromise between over- and under-irrigation of the area portions adjacent the end of the irrigation zone. These measures, of course, apply specifically to the use of a rotary water gun or a similar irrigation means, while they would be impertinent if the irrigation is effected by means of a transverse sprinkler boom effecting irrigation solely at both lateral sides of the irrigation device.

It will be appreciated that the preprogrammable differential irrigation control should not necessarily be based on the described step-by-step movement of the irrigation device with associated stepwise irrigation control, since the essential feature is that control means are provided for enabling the rate of irrigation per square unit to be changed automatically, according to preset requirements, when the irrigation device passes preselected points of the irrigation zone. In systems where the irrigation device is pulled home by means of a stationary winch the entire control equipment may be located at the winch end, including means for detecting the progress of the irrigating device, by time or distance, and presettable actuator means operable to effect a change of the irrigation rate, e.g. by causing a throttling of the water flow to the hose or a change of the pulling speed of the winch, in response to the position detecting means indicating that the irrigation device has come up to a point in which the irrigation is preset to be changed.

It will be readily understood that there will be almost innumerable possibilities of effecting detection of the irrigation device coming up to the various points from which a different irrigation rate should be effected, and of causing such a different irrigation rate to be achieved according to the preset requirements. One solution is to mount in the ground or on the hose, at the appropriate points, suitable actuator members designed so as to cooperate with adjustment control means on the irrigator device in such a selective manner that the control means by said passage are caused to change the irrigation correspondingly, preferably by way of an adjustment of the speed or average speed of the irrigation device. Normally, as mentioned, it is not desirable to effect an irrigation adjustment by adjusting the water supply rate, when a rotary water gun is used, but if the irrigation device carries two or even more water guns it may well be possible to effect irrigation control at constant speed by causing one or more water guns to be switched on or off according to the requirements, whereby the effective width of the irrigation zone is not changed. In practice it will normally be acceptable to make the irrigation capacity variable in a corresponding stepwise manner.

It will be understood that a desired irrigation change at any irrigation zone portion will be achievable by any combination of suitable position detecting means and suitable irrigation control means. The device described with reference to FIG. 3 is rather sophisticated because it allows for a very accurate determination of both the geographical irrigation change positions of the irrigator and of the irrigation rates along the various zone portions, just as it provides for a highly constant irrigation along each of these zone portions. If the accuracy requirements in all or some of these three respects are not very high, the control means may of course be correspondingly simplified.

What is claimed is:

1. An agricultural irrigation apparatus of the type having a flexible water supply hose, one end of which is connectable with a stationary water supply source and another end of which is connected to an irrigation device that is operable to be moved along an irrigation zone and spray water therealong, driving means for advancing the irrigation device along consecutive partial lengths of said irrigation zone, and control means for controlling the operation of said driving means along each of said partial lengths of the irrigation zone, characterized in that an advancement measuring means is provided for measuring the actual displacement of the irrigation device along the irrigation zone independent of the time of operation of said driving means, said advancement measuring means being operatively connected to said control means for producing a displacement control signal at the end of each partial length, and in that irrigation control means are provided for producing an irrigation control signal in response to the attainment of a predetermined amount of irrigation in each respective partial length, said control means being operable to stop or substantially slow down the speed of said driving means from an advancement speed thereof in response to said displacement control signal and being operable to return said driving means to said advancement speed in response to said irrigation control signal.

2. An apparatus according to claim 1, in which said control means comprise an adjustable memory element for indication of a predetermined or desired irrigation per movement step of the irrigation device.

3. An apparatus according to claim 1, wherein the driving means is mounted on the irrigation device and comprises a hydraulic motor driven by a partial flow of the irrigation water as supplied to the motor through a branch conduit, characterized in that the control means comprises a valve mounted in said branch conduit and adapted to be closed or throttled down in response to the displacement control signal and to be reopened in response to the irrigation control signal.

4. An apparatus according to claims 1 or 3, in which the advancement measuring means comprises a wheel rolling passively along the ground and connected with sensor means for registering the rotation of the wheel, said sensor means being operatively connected with said control means for supplying thereto informations indicative of the real advancement of the irrigation device.

5. An apparatus according to claim 1, in which the irrigation control means comprises a timer for producing said irrigation control signal and memory means for the desired amount of irrigation per each partial length, said memory means setting said timer for a respective predetermined period of operation for each of said partial lengths at the start of each respective partial length.

6. An apparatus according to claim 1, in which the water supply system of the hose comprises a security valve for interrupting the flow of water to said irrigation device in response to reception of an emergency control signal, characterized in that means are provided for producing said emergency control signal in response to detector means detecting the continued presence of the irrigation device in any of said partial lengths substantially later than said irrigation control signal is produced for that partial length.

7. An apparatus according to claim 6, in which said security valve is operable to produce a pronounced pressure drop in the water supply hose system by providing a free water exhaust from the hose system, a further water supply control being provided for terminating the supplying of water to said hose system in response to said pressure drop.

8. An apparatus according to claims 1 or 7, in which the irrigation control means comprises a water meter mounted in an irrigation conduit.

9. An apparatus according to claim 1, characterized in that the irrigation control means comprises means for defining predetermined irrigation requirements per length unit of the irrigation zone and includes memory register means operable to effect individual presetting of individual irrigation requirements for each of said partial lengths or groups of such lengths.

10. An apparatus according to claim 1, comprising a presettable selector means operable to automatically control the rate of irrigation according to individual predetermined irrigation requirements along respective various partial lengths of said irrigation zone.

11. An apparatus according to claim 10, characterized in that the selector means comprises detecting means operable to register the advancement of the irrigation device along the irrigation zone and selectively presettable memory means referring to predetermined respective irrigation requirements along the various partial zone lengths, said selector means cooperating with said memory means so as to effect irrigation control by way of irrigation rate control in accordance with conditions given by the respective memory means.

12. An apparatus according to claim 11, in which the detecting means is connected with a drive register means operatively indicative of the respective positions of the irrigator device along the zone, said memory means being connected with said drive register means such that the setting or resetting of the memory means at any time or place during the travel of the irrigation device along the zone, at one end of a respective partial length thereof, will be responded to by the irrigation control means when the device is later moved past the respective front end of said partial length, e.g., by a reverse travel at generally reduced speed.

13. An apparatus according to claim 11, in which for specifically meeting the extreme requirement of the irrigation along all the individual partial lengths being identic, said memory means comprises a single memory unit which cooperates repeatedly with said irrigation control means at an end of each respective partial length, said memory unit being adjustable to suit various irrigation requirements.

14. An apparatus according to claim 1 or 10, in which delay means are provided for causing the irrigation device to remain in a position at the beginning and/or end of the irrigation zone during a time interval longer than required for effecting the predetermined irrigation of the corresponding length of the irrigation zone.

15. An apparatus according to claim 10, characterized in that the selector means comprises detecting means operable to register the advancement of the irrigation device along the irrigation zone and selectively presettable memory means referring to predetermined respective irrigation requirements along the various partial zone lengths, said selector means cooperating with said memory means so as to effect irrigation control by way of average advancement speed control in accordance with conditions given by the respective memory means.

16. In an agricultural irrigation apparatus of the type having a flexible water supply hose, one end of which is connectable with a stationary water supply source and another end of which is connected to an irrigation device that is operable to be moved along an irrigation zone and spray water therealong, driving means for advancing the irrigation device along consecutive partial lengths of said irrigation zone, and control means for controlling the operation of said driving means along each of said partial lengths of the irrigation zone, the improvement comprising measuring means associated with the control means for individually controlling the advance of said irrigation device during each of said partial lengths in response to measurements of both the actual distance travelled and amount of irrigation supplied by said irrigation device to insure that individual irrigation requirements of the respective partial lengths are met.

* * * * *